(12) United States Patent
Hong et al.

(10) Patent No.: US 9,703,044 B2
(45) Date of Patent: Jul. 11, 2017

(54) WAVELENGTH DIVISION MULTIPLEXING

(71) Applicant: FINISAR CORPORATION, Sunnyvale, CA (US)

(72) Inventors: Xiaogang Hong, Shanghai (CN); Tao Wu, Union City, CA (US); Fei Li, Shanghai (CN); Chunxiang Zhang, Shanghai (CN); Shanshan Zeng, Shanghai (CN); Hongyu Deng, Saratoga, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 14/883,175

(22) Filed: Oct. 14, 2015

(65) Prior Publication Data

US 2017/0082803 A1    Mar. 23, 2017

(30) Foreign Application Priority Data

Sep. 18, 2015   (CN) .......................... 2015 1 0600341

(51) Int. Cl.
  *G02B 6/293* (2006.01)
  *H04J 14/06* (2006.01)
  *H04J 14/02* (2006.01)
  *G02B 27/00* (2006.01)

(52) U.S. Cl.
  CPC ....... *G02B 6/2938* (2013.01); *G02B 6/29302* (2013.01); *G02B 27/0012* (2013.01); *H04J 14/02* (2013.01); *H04J 14/06* (2013.01)

(58) Field of Classification Search
  CPC ...... H04J 14/06; G02B 6/4213; G02B 6/4215
  See application file for complete search history.

(56) References Cited

U.S. PATENT DOCUMENTS

| 9,008,474 B2* | 4/2015 | Nakanishi ............ G02B 6/4206 385/33 |
| 9,215,032 B2* | 12/2015 | Zhang .................... G02B 27/28 |
| 2002/0041574 A1* | 4/2002 | Du ..................... G02B 6/12019 370/300 |

* cited by examiner

Primary Examiner — Omar R Rojas
(74) Attorney, Agent, or Firm — Maschoff Brennan

(57) ABSTRACT

A system may include a first light source configured to generate a first beam of light at a first wavelength; a second light source configured to generate a second beam of light at a second wavelength; a third light source configured to generate a third beam of light at a third wavelength; and a fourth light source configured to generate a fourth beam of light at a fourth wavelength. The system may also include a thin-film filter, a first polarization beam splitter (PBS), a wave plate and a second PBS. The thin-film filter, the first PBS, the wave plate, and the second PBS may be configured to combine the first beam, the second beam, the third beam and the fourth beam into a combined beam of light.

20 Claims, 6 Drawing Sheets

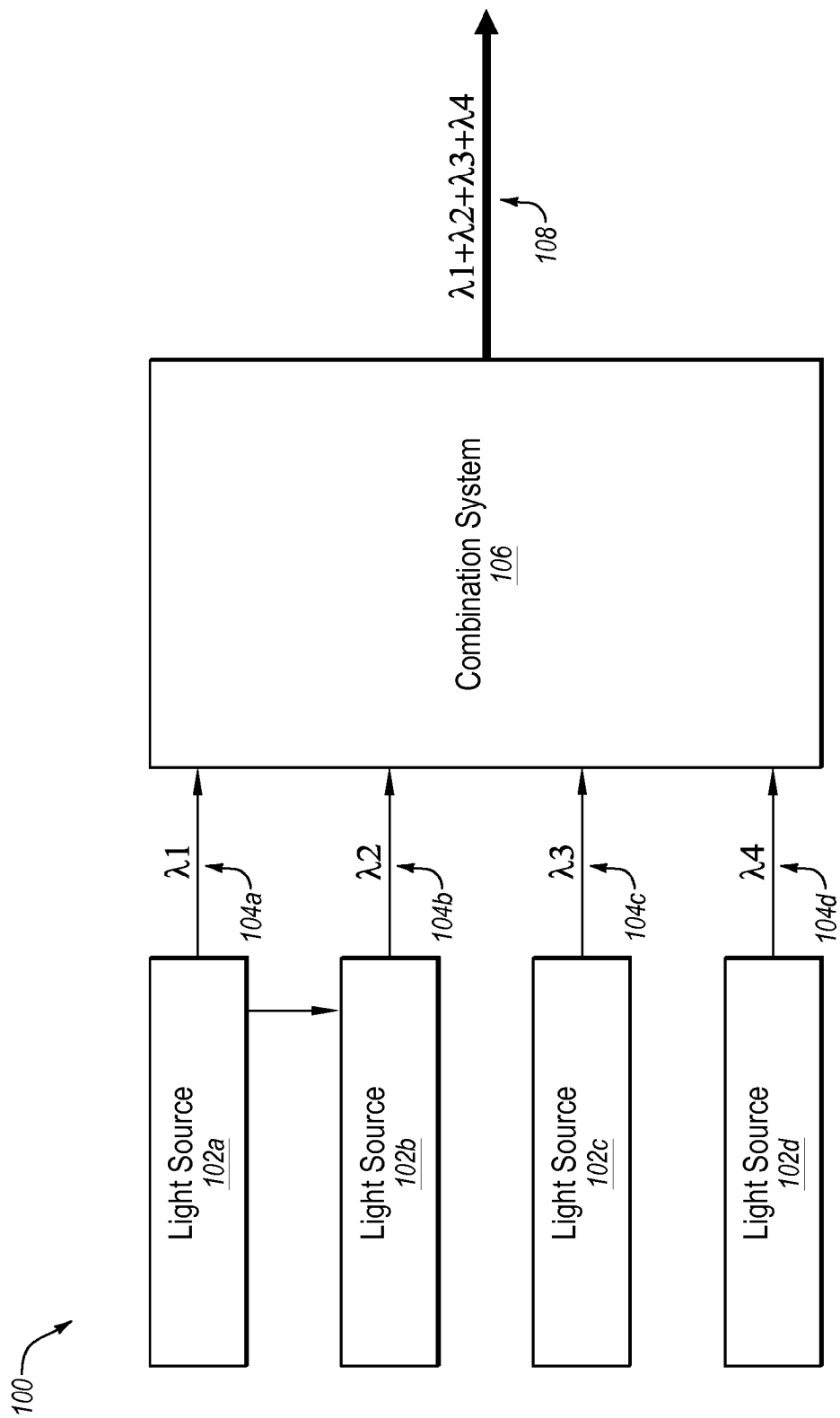

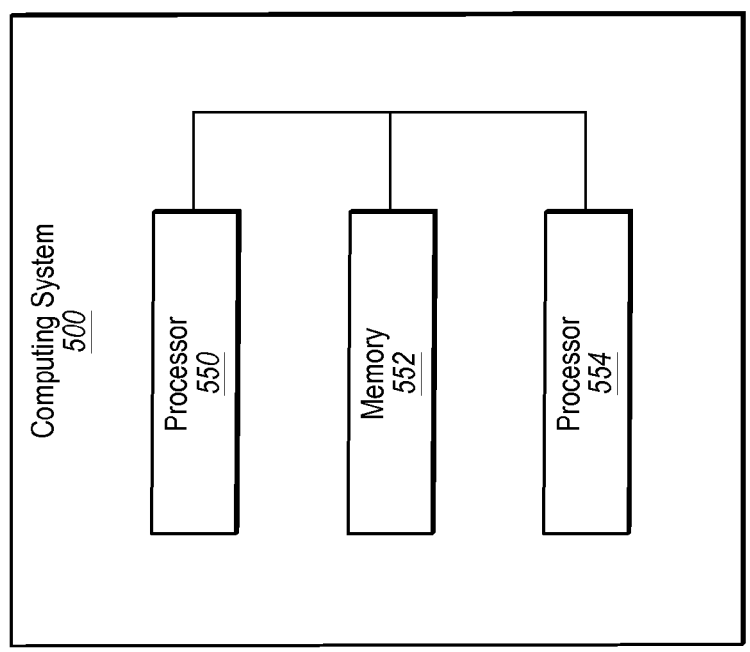

WAVELENGTH DIVISION MULTIPLEXING

CROSS-REFERENCE TO RELATED APPLICATIONS

This patent application claims the benefit of and priority to Chinese Patent Application No. 201510600341.7, filed Sep. 18, 2015, which is incorporated herein by reference in its entirety.

FIELD

The embodiments discussed in the present disclosure are related to wavelength division multiplexing.

BACKGROUND

Telecommunications systems, cable television systems and data communication networks use optical networks to rapidly convey large amounts of information between remote points. In an optical network, information is conveyed in the form of optical signals modulated onto beams of light through optical fibers. Optical networks often employ wavelength division multiplexing (WDM). In WDM networks, a number of optical signals are carried in an optical fiber via beams of light that include disparate wavelengths, thereby increasing network capacity.

The subject matter claimed in the present disclosure is not limited to embodiments that solve any disadvantages or that operate only in environments such as those described above. Rather, this background is only provided to illustrate one or more example technology areas where some embodiments described in the present disclosure may be practiced.

SUMMARY

According to an aspect of an embodiment, a system may include a first light source configured to generate a first beam of light at a first wavelength. The system may also include a second light source configured to generate a second beam of light at a second wavelength. Further, the system may include a third light source configured to generate a third beam of light at a third wavelength. Moreover, the system may include a fourth light source configured to generate a fourth beam of light at a fourth wavelength. The system may also include a thin-film filter configured to receive the first beam and the fourth beam and configured to combine the first beam and the fourth beam into a fifth beam of light that includes the first beam at the first wavelength and the fourth beam at the fourth wavelength. The system may also include a first polarization beam splitter (PBS) configured to receive the second beam and the fifth beam and configured to combine the second beam and the fifth beam into a sixth beam of light that includes the first beam at the first wavelength, the second beam at the second wavelength, and the fourth beam at the fourth wavelength. In addition, the system may include a wave plate configured to receive the sixth beam and configured to rotate a polarization orientation of the sixth beam. The system may also include a second PBS configured to receive the third beam and the sixth beam following rotation of the polarization orientation of the sixth beam and configured to combine the third beam and the sixth beam into a seventh beam of light that includes the first beam at the first wavelength, the second beam at the second wavelength, the third beam at the third wavelength, and the fourth beam at the fourth wavelength.

The object and advantages of the embodiments will be realized and achieved at least by the elements, features, and combinations particularly pointed out in the claims. Both the foregoing general description and the following detailed description are examples and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1 is a diagram representing an example Transmit Optical Sub-Assembly (TOSA) configured to employ wavelength division multiplexing (WDM);

FIG. 5 is an example embodiment of a computing system.

DESCRIPTION OF EMBODIMENTS

Figure 2A:
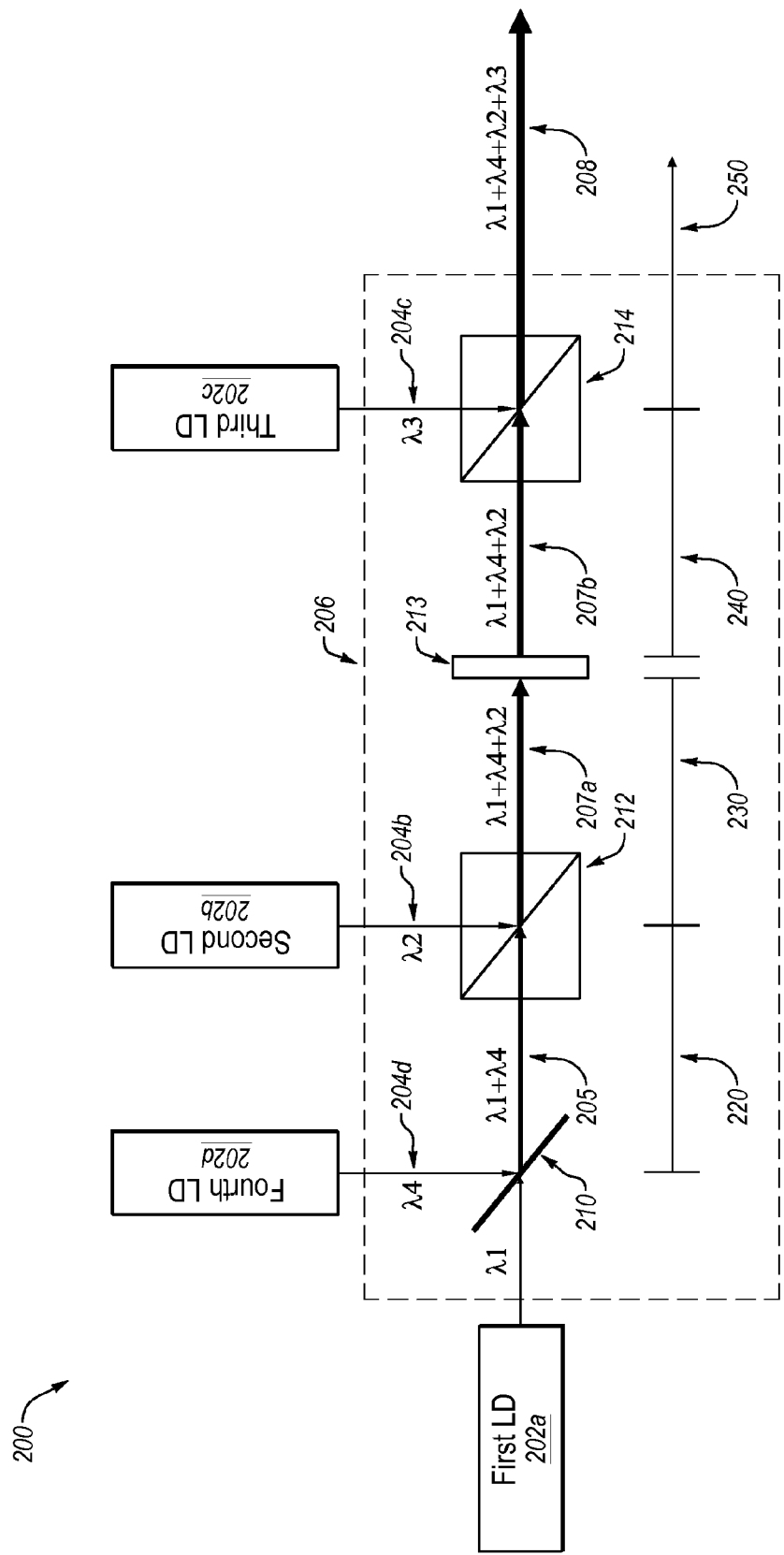
FIG. 2A is a diagram representing an example embodiment of a TOSA configured to employ WDM.

Wavelength division multiplexing (WDM) is often employed in optical communication in which a number of optical signals are carried in an optical fiber via beams of light that include disparate wavelengths, thereby increasing network capacity. In the present disclosure, use of the term "WDM" with respect to signals, systems, or components may refer to any signal, system, or component that may be configured or based on WDM methodologies.

As disclosed in detail below, the present disclosure relates to systems and methods of employing WDM with respect to the transmission of optical signals. In particular, in some embodiments, a Transmit Optical Sub-Assembly (TOSA) may be configured to combine multiple beams of light ("beams") that may each have different wavelengths to generate a WDM beam. As described below, the TOSA may be configured to combine the beams in a manner that may reduce a number of components or that may reduce cost.

Embodiments of the present disclosure are explained with reference to the accompanying drawings.

FIG. 1 is a diagram representing an example TOSA 100 configured to employ WDM, according to some embodiments of the present disclosure. In some embodiments, the TOSA 100 may include multiple light sources and a combination system 106.

In the particular embodiment, the TOSA 100 may include a first light source 102a, a second light source 102b, a third light source 102c, and a fourth light source 102d (referred to generally or collectively as "light source(s) 102"). The light sources 102 may each include any suitable system, apparatus, or device configured to generate a beam. For example, each light source 102 may include a laser diode, or an optical lens, configured to generate a beam.

In the example embodiment, the first light source 102a may be configured to generate a first beam of light 104a ("first beam 104a"), the second light source 102b may be configured to generate a second beam of light 104b ("second beam 104b"), the third light source 102c may be configured to generate a third beam of light 104c ("third beam 104c"), and the fourth light source 102d may be configured to generate a fourth beam of light 104d ("fourth beam 104d").

The beams 104a, 104b, 104c, and 104d may be referred to generally or collectively as beam(s) 104. In some embodiments, one or more of the light sources 102 may be configured to modulate data onto their respective beams 104 such that the corresponding beams 104 may include optical signals.

In some embodiments, the light sources 102 may be configured to generate the beams to have different wavelengths. For example, the first light source 102a may be configured to generate the first beam 104a such that the first beam 104a has a first wavelength "λ1"; the second light source 102b may be configured to generate the second beam 104b such that the second beam 104b has a second wavelength "λ2"; the third light source 102c may be configured to generate the third beam 104c such that the third beam 104c has a third wavelength "λ3"; and the fourth light source 102d may be configured to generate the fourth beam 104d such that the fourth beam 104d has a fourth wavelength "λ4".

In some embodiments, the wavelengths of the beams 104 may be based on a particular WDM scheme. For example, in some embodiments, the TOSA 100 may be configured based on a Course WDM (CWDM) scheme in which wavelengths may be separated by 20 nanometers (nm). For example, the first light source 102a and the second light source 102b may be configured such that a first difference between the first wavelength and the second wavelength may be at least substantially equal to 20 nm; the second light source 102b and the third light source 102c may be configured such that a second difference between the second wavelength and the third wavelength may be at least substantially equal to 20 nm; and the third light source 102c and the fourth light source 102d may be configured such that a third difference between the third wavelength and the fourth wavelength may be at least substantially equal to 20 nm. In these or other embodiments, the first light source 102a and the third light source 102c may be configured such that a fourth difference between the first wavelength and the third wavelength may be at least substantially equal to 40 nm and the first light source 102a and the fourth light source 102d may be configured such that a fifth difference between the first wavelength and the fourth wavelength may be at least substantially equal to 60 nm. In particular, in some embodiments, the first wavelength may be approximately equal to or equal to 1270 nm, the second wavelength may be approximately equal to or equal to 1290 nm, the third wavelength may be approximately equal to or equal to 1310 nm, and the fourth wavelength may be approximately equal to or equal to 1330 nm.

In some embodiments, the light sources 102 may be configured such that their respectively generated beams 104 have a particular polarization orientation. In these or other embodiments, the polarization orientation of the beams 104 may include a first polarization orientation or a second polarization orientation. For example, as detailed further below, in some embodiments, the first light source 102a and the fourth light source 102d may be configured such that the first beam 104a and the fourth beam 104d may have the first polarization orientation. In these or other embodiments, the second light source 102b and the third light source 102c may be configured such that the second beam 104b and the third beam 104c have the second polarization orientation.

In some embodiments, the first polarization orientation and the second polarization orientation may be substantially perpendicular to each other. For example, in some embodiments, the first polarization orientation may include a transverse-magnetic (TM) polarization orientation and the second polarization orientation may include a transverse-electric (TE) polarization orientation.

The combination system 106 may be configured to receive each of the beams 104. Further, the combination system 106 may be configured to combine the beams 104 into a combined beam 108. The combined beam 108 may include the first beam 104a at the first wavelength, the second beam 104b at the second wavelength, the third beam 104c at the third wavelength, and the fourth beam 104d at the fourth wavelength. In some embodiments, the combined beam 108 may include data modulated thereon such that the combined beam 108 may include an optical signal. By combining the beams 104 into the combined beam 108, the combination system 106 may be configured to employ WDM techniques.

Modifications, additions, or omissions may be made to the TOSA 100 without departing from the scope of the present disclosure. For example, the TOSA 100 may include components other than those explicitly described. Further, the number of light sources, the wavelength differences, and the wavelength values, are given as examples and are not necessarily limiting.

FIG. 2A is a diagram representing an example embodiment of a TOSA 200 configured to employ WDM, according to one or more embodiments of the present disclosure. The TOSA 200 may include laser diodes and a combination system 206.

In the example of FIG. 2A, the TOSA 200 may include a first laser diode (LD) 202a, a second laser diode (LD) 202b, a third laser diode (LD) 202c, and a fourth laser diode (LD) 202d (referred to generally or collectively as "laser diode(s) 202"). The laser diodes 202 are examples of light sources 102 of FIG. 1.

The first laser diode 202a may be configured to generate a first beam of light 204a ("first beam 204a"), the second laser diode 202b may be configured to generate a second beam of light 204b ("second beam 204b"), the third laser diode 202c may be configured to generate a third beam of light 204c ("third beam 204c"), and the fourth laser diode 202d may be configured to generate a fourth beam of light 204d ("fourth beam 204d"). The beams 204a, 204b, 204c, and 204d may be referred to generally or collectively as beam(s) 204. In some embodiments, one or more of the laser diodes 202 may be configured to modulate data onto their respective beams 204 such that the corresponding beams 204 may include optical signals.

In some embodiments, the first laser diode 202a may be configured to generate the first beam 204a such that the first beam 204a has a first wavelength "λ1"; the second laser diode 202b may be configured to generate the second beam 204b such that the second beam 204b has a second wavelength "λ2"; the third laser diode 202c may be configured to generate the third beam 204c such that the third beam 204c has a third wavelength "λ3"; and the fourth laser diode 202d may be configured to generate the fourth beam 204d such that the fourth beam 204d has a fourth wavelength "λ4".

The first wavelength, the second wavelength, the third wavelength, and the fourth wavelength may be analogous to the first, second, third, and fourth wavelengths described above with respect to FIG. 1. For example, in some embodiments, the wavelengths in FIG. 2A may get progressively larger in which the first wavelength may be smaller than the second wavelength, the second wavelength may be smaller than the third wavelength, and the third wavelength may be smaller than the fourth wavelength.

Additionally or alternatively, the wavelengths in FIG. 2A may be based on a CWDM scheme such that: a first difference between the first wavelength and the second wavelength may be at least substantially equal to 20 nm; a second difference between the second wavelength and the third wavelength may be at least substantially equal to 20 nm; and a third difference between the third wavelength and the fourth wavelength may be at least substantially equal to 20 nm. In particular, in some embodiments, the first wavelength may be approximately equal to or equal to 1270 nm, the second wavelength may be approximately equal to or equal to 1290 nm, the third wavelength may be approximately equal to or equal to 1310 nm, and the fourth wavelength may be approximately equal to or equal to 1330 nm.

Additionally or alternatively, in some embodiments, the first laser diode 202a and the fourth laser diode 202d may be configured such that the first beam 204a and the fourth beam 204d have a substantially same polarization orientation. In these or other embodiments, the second laser diode 202b and the third laser diode 202c may be configured such that the second beam 204b and the third beam 204c have a substantially same polarization orientation that is at least substantially perpendicular to the polarization orientation of the first beam 204a and the fourth beam 204d.

Figure 2B:
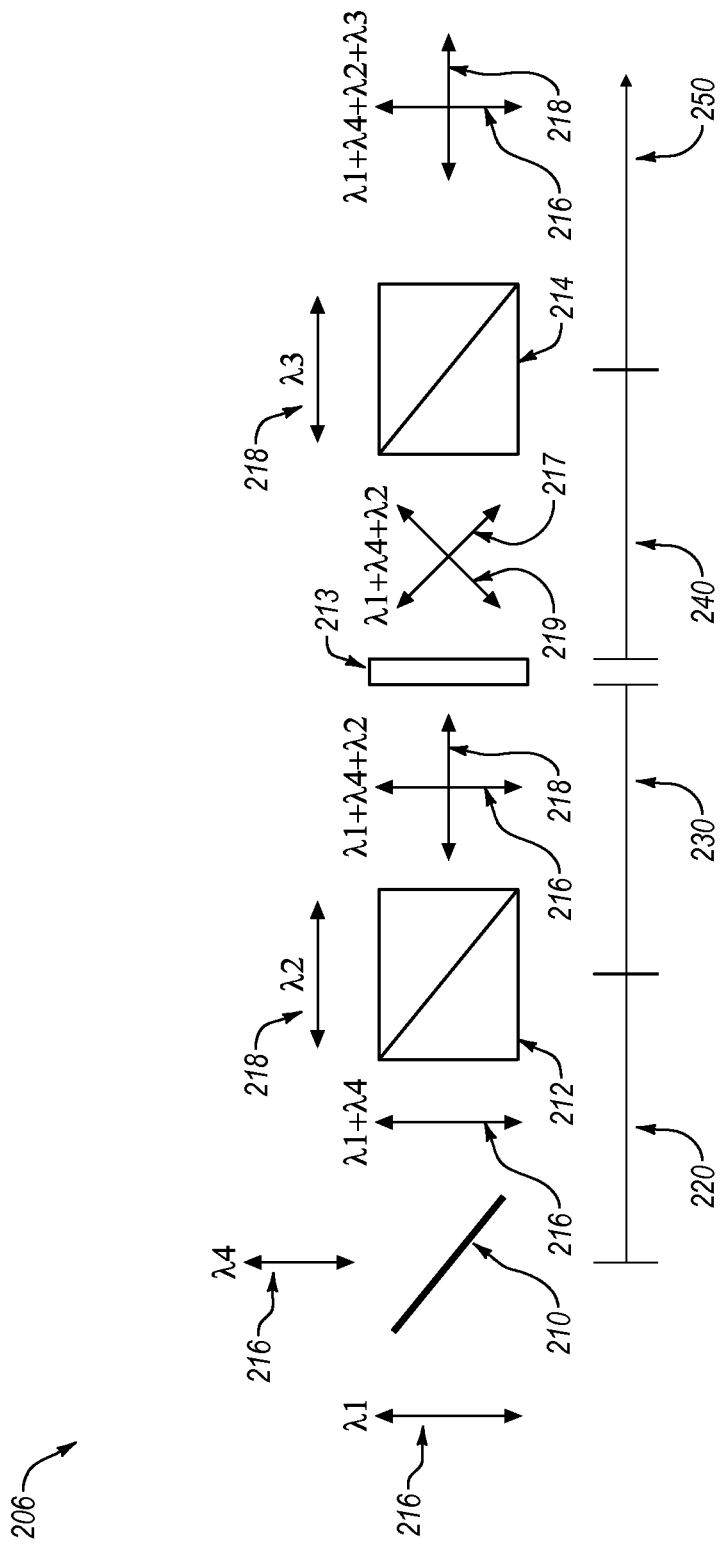
FIG. 2B illustrates example polarization orientations of beams that may be within the combination system of FIG. 2A.

By way of example, FIG. 2B illustrates example relative polarization orientations of beams within the combination system 206, according to some embodiments of the present disclosure. In FIG. 2B, the first beam 204a and the fourth beam 204d may have a first polarization orientation 216. The first beam 204a and the fourth beam 204d are not explicitly illustrated in FIG. 2B but are indicated by their corresponding wavelengths "λ1" and "λ4" in FIG. 2B. Additionally in FIG. 2B, the second beam 204b and the third beam 204c may have a second polarization orientation 216. The second beam 204b and the third beam 204c are not explicitly illustrated in FIG. 2B but are indicated by their corresponding wavelengths "λ2" and "λ4" in FIG. 2B.

In the illustrated example, the first polarization orientation 216 and the second polarization orientation 218 are indicated by vertical and horizontal arrows, respectively. Such a depiction is given to indicate that the first polarization orientation 216 and the second polarization orientation 218 are substantially perpendicular to each other and does not necessarily represent the actual directions of the polarization orientations.

Returning to FIG. 2A, the combination system 206 is an example embodiment of the combination system 106 of FIG. 1. As such, the combination system 206 may be configured to receive the first beam 204a, the second beam 204b, the third beam 204c, and the fourth beam 204d. Further, the combination system 206 may thus also be configured to combine the beams 204 into a combined beam 208. Similar to the combined beam 108 of FIG. 1, the combined beam 208 may include the first beam 204a at the first wavelength, the second beam 204b at the second wavelength, the third beam 204c at the third wavelength, and the fourth beam 204d at the fourth wavelength. In some embodiments, the combined beam 208 may include data modulated thereon such that the combined beam 208 may include an optical signal.

In some embodiments, the combination system 206 may include a filter 210, a first polarization beam splitter (PBS) 212, a wave plate 215, and a second PBS 214. As detailed below, the filter 210, the first PBS 212, the wave plate 215, and the second PBS 214 may be configured to generate the combined beam 208 from the first beam 204a, the second beam 204b, the third beam 204c, and the fourth beam 204d.

In some embodiments, the filter 210 may be configured to receive the first beam 204a and the fourth beam 204d. The filter 210 may include any suitable system, apparatus, or device configured to allow light within a certain wavelength range to pass through it (also referred to as the bandwidth of the filter 210) and that is configured to reflect light that is outside of the bandwidth of the filter 210. In some embodiments, the filter 210 may include a thin film filter that is configured as such. In some embodiments the filter 210 may be configured based on the filter 210 being configured to receive the first beam 204a and the fourth beam 204d.

For example, the filter 210 may be configured based on the first wavelength of the first beam 204a such that the first wavelength of the first beam 204a is within the bandwidth of the filter 210. Additionally, the filter 210 may be configured to have an isolation such that the fourth wavelength of the fourth beam 204d may be outside of the bandwidth of the filter 210. For example, the first wavelength and the fourth wavelength may have a 60 nm difference such that the filter 210 may have an isolation that is at least approximately less than or equal to 60 nm. In some embodiments, the filter 210 may have an isolation between 40 nm and 60 nm. As such, the filter 210 may be configured to pass the first beam 204a and to reflect the fourth beam 204d.

Although described as being configured with respect to receiving the first beam 204a and the fourth beam 204d based on the corresponding first and fourth wavelengths, the filter 210 may be configured with respect to any other combination of beams 204. However, configuring the filter 210 based on the beams 204 with the furthest spaced wavelengths may reduce costs because the isolation of the filter 210 may be broader than if the filter 210 were configured based on beams with closer wavelengths.

The filter 210 may be configured (e.g., positioned) such that the first beam 204a passes through the filter 210 and such that the fourth beam 204d reflects off the filter 210 in a particular manner (e.g., as illustrated in FIG. 2A) that may create a combined beam of light 205 ("combined beam 205"). The combined beam 205 may include the first beam 204a at the first wavelength and the fourth beam 204d at the fourth wavelength. The combined beam 205 may propagate within a portion 220 of the combination system 206 that is between the filter 210 and the first PBS 212.

In some embodiments, the polarization orientations of the first beam 204a and the fourth beam 204d may be maintained within the combined beam 205. For example, FIG. 2B illustrates that the combined beam 205 has the first polarization orientation 216 within the portion 220. The combined beam 205 is not explicitly illustrated in FIG. 2B but is indicated by the label "λ1+λ4" given with respect to the corresponding wavelengths of the combined beam 205. Additionally, both the first beam 204a and the fourth beam 204d of the combined beam 205 may have the first polarization orientation 216 such that the combined beam 205 may include two beams that both have the first polarization orientation 216. However, for simplification of the illustration, only one indication of the first polarization orientation 216 of the combined beam 205 is depicted in FIG. 2B due to the first beam 204a and the fourth beam 204d both substantially having the first polarization orientation 216.

Returning to FIG. 2A, in some embodiments the first PBS 212 may be configured to receive the combined beam 205 and the second beam 204b. The first PBS 212 may include any suitable system, apparatus, or device that is configured to allow a particular polarization orientation to pass through it and that is configured to reflect other polarization orientations or components thereof. In some embodiments, the first PBS 212 may be configured based on the first PBS 212 being configured to receive the combined beam 205 and the second beam 204b.

For example, the first PBS 212 may be configured to allow the first polarization orientation 216 to pass through it and may also be configured to reflect the second polarization orientation 218. As such, the first PBS 212 may be configured to allow the combined beam 205 to pass through it and may be combined to reflect the second beam 204b.

The first PBS 212 may be configured (e.g., positioned) such that the combined beam 205 passes through the first PBS 212 and such that the second beam 204b reflects off the first PBS 212 in a particular manner (e.g., as illustrated in FIG. 2A) that may create a combined beam of light 207a ("combined beam 207a"). The combined beam 207a may include the first beam 204a at the first wavelength, the fourth beam 204d at the fourth wavelength, and the second beam 204b at the second wavelength. The combined beam 207a may propagate within a portion 230 of the combination system 206 that is between the first PBS 212 and the wave plate 213.

In an alternative embodiment, the first PBS 212 may be configured to allow the first polarization orientation 218 to pass through it and may also be configured to reflect the second polarization orientation 216 such that the combined beam 205 may pass through the first PBS 212 and such that the second beam 204b may be reflected by the first PBS 212.

In some embodiments, the polarization orientations of the first beam 204a, the fourth beam 204d, and the second beam 204b may be maintained within the combined beam 207a. For example, FIG. 2B illustrates that the combined beam 207a has the first polarization orientation 216 and the second polarization orientation 218 within the portion 230. The combined beam 207a is not explicitly illustrated in FIG. 2B but is indicated by the label "λ1+λ4+λ2" given with respect to the corresponding wavelengths of the combined beam 207. Additionally, both the first beam 204a and the fourth beam 204d of the combined beam 207a may have the first polarization orientation 216 such that the combined beam 207a may include two beams that both have the first polarization orientation 216. However, for simplification of the illustration, only one indication of the first polarization orientation 216 of the combined beam 207a is depicted in FIG. 2B due to the first beam 204a and the fourth beam 204d both substantially having the first polarization orientation 216. Further, the second polarization orientation 218 indicated with respect to the combined beam 207a may be based on the second beam 204b, which may be included in the combined beam 207a, having the second polarization orientation 218.

Returning to FIG. 2A, in some embodiments, the wave plate 213 may be configured to receive the combined beam 207a. Additionally, the wave plate 213 may be configured to rotate the polarization orientations of the combined beam 207a. For example, in some embodiments, the wave plate 213 may include a half-wave plate.

Additionally or alternatively, the wave plate 213 may be configured to rotate the polarization orientations of the combined beam 207a by 45° or approximately 45°. For example, in some embodiments, the wave plate 213 may include a half-wave plate that includes a fast axis that may be aligned to 22.5° or approximately 22.5° with respect to the first polarization orientation 216 or the second polarization orientation 218. Such an alignment may cause the polarization orientation of the combined beam 207a to rotate by 45° or approximately 45° to modify the combined beam 207a into a combined beam of light 207b ("rotated combined beam 207b") with a rotated polarization orientation as compared to the combined beam 207a. The polarization orientation of the rotated combined beam 207b at a portion 240 of the combination system 206 between the wave plate 213 and the second PBS 214 may have a 45° or approximate 45° rotation as compared to the polarization orientation of the combined beam 207a at the portion 230 of the combined system 206.

For example, FIG. 2B illustrates that the rotated combined beam 207b at the portion 240 includes a polarization orientation 217 and a polarization orientation 219. The polarization orientations 217 and 219 may be rotated at 45° or approximately 45° with respect to the first polarization orientation 216 and the second polarization orientation 218. As such, half or approximately half of the polarization orientations 217 and 219 may be components of the first polarization orientation 216 and half or approximately half of the polarization orientations be components of the second polarization orientation 218. The rotated combined beam 207b is not explicitly illustrated in FIG. 2B but is indicated by the label "λ1+λ4+λ2" given with respect to the corresponding wavelengths of the rotated combined beam 207b.

In some embodiments the second PBS 214 may be configured to receive the rotated combined beam 207b and to receive the third beam 204c. The second PBS 214 may include any suitable system, apparatus, or device that is configured to allow a particular polarization orientation to pass through it and that is configured to reflect other polarization orientations or components thereof. In some embodiments, the second PBS 214 may be configured based on the second PBS 214 being configured to receive the rotated combined beam 207b and the third beam 204c.

For example, the second PBS 214 may be configured to allow the first polarization orientation 216 to pass through it and may also be configured to reflect the second polarization orientation 218. As such, the second PBS 214 may be configured to allow the components of the first polarization orientation 216 of the polarization orientations 217 and 219 of the rotated combined beam 207b to pass through it. Further, the second PBS 214 may be configured to reflect the components of the second polarization orientation 218 of the polarization orientations 217 and 219 of the rotated combined beam 207b. Additionally, the second PBS 214 may be combined to reflect the third beam 204c due to the third beam 204c substantially having the second polarization orientation 218.

The second PBS 214 may be configured (e.g., positioned) such that the components of the first polarization orientation 216 of the rotated combined beam 207b pass through the second PBS 214 and such that the components of the second polarization orientation 218 of the rotated combined beam 207b are reflected by the second PBS 214. Further, the second PBS 214 may be configured such that the third beam 204c reflects off the second PBS 214. Additionally, the second PBS 214 may be configured such the reflections and passing of the light occur in a particular manner (e.g., as illustrated in FIG. 2A) that may create a combined beam of light 208 ("combined beam 208"). The combined beam 208 may include the first beam 204a at the first wavelength, the fourth beam 204d at the fourth wavelength, the second beam 204b at the second wavelength, and the third beam 204c at the third wavelength. The combined beam 208 may be emitted at a portion 250 of the combination system 206 that is after the second PBS 214.

FIG. 2B illustrates the polarization orientations of the combined beam 208 when emitted at the portion 250. The combined beam 208 is not explicitly illustrated in FIG. 2B but is indicated by the label "λ1+λ4+λ2+λ3" given with respect to the corresponding wavelengths of the combined beam 208. Due to the components of the first polarization orientation 216 of the rotated combined beam 207b passing through the second PBS 214 and the components of the second polarization orientation of the rotated combined beam 207b being reflected by the second PBS 214, the first beam 204a, the second beam 204b, and the fourth beam 204d of the combined beam 208 may have the first polarization orientation 216 such that the combined beam 208 may include three beams that each substantially have the first polarization orientation 216. However, for simplification of the illustration, only one indication of the first polarization orientation 216 of the combined beam 208 is depicted in FIG. 2B due to the first beam 204a and the fourth beam 204d both substantially having the first polarization orientation 216. Further, the second polarization orientation 218 indicated with respect to the combined beam 208 may be based on the third beam 204c, which may be included in the combined beam 208, having the second polarization orientation 218.

In some embodiments, the powers of the first beam 204a, the second beam 204b, and the fourth beam 204d included in the combined beam 208 may be approximately half or half of their respective powers before the rotated combined beam 207b passes through the second PBS 214 due to the loss of the components of the second polarization orientation 218. In these or other embodiments, the laser diodes 202 may be configured such that the first beam 204a, the second beam 204b, and the fourth beam 204d respectively leave the first laser diode 202a, the second laser diode 202b, and the fourth laser diode 202d with a power level that is approximately equal to or equal to twice that as the power level of the third beam 204c as it leaves the third laser diode 202c. As such, the power of each beam 204 of the combined beam 208 may be approximately equal to or equal to each other in such instances.

The TOSA 200 may accordingly be configured to employ WDM to combine the beams 204 into the combined beam 208. Modifications, additions, or omissions may be made to the TOSA 200 without departing from the scope of the present disclosure. For example, the TOSA 200 may include components other than those explicitly described. In addition, one or more of the beams described above may have information modulated thereon such that they may be considered optical signals. Further, the actual wavelengths of the beams and their polarization orientations may be modified depending on particular embodiments as long as the principles described with respect to relative polarization orientations and different wavelengths are followed.

Figure 3:
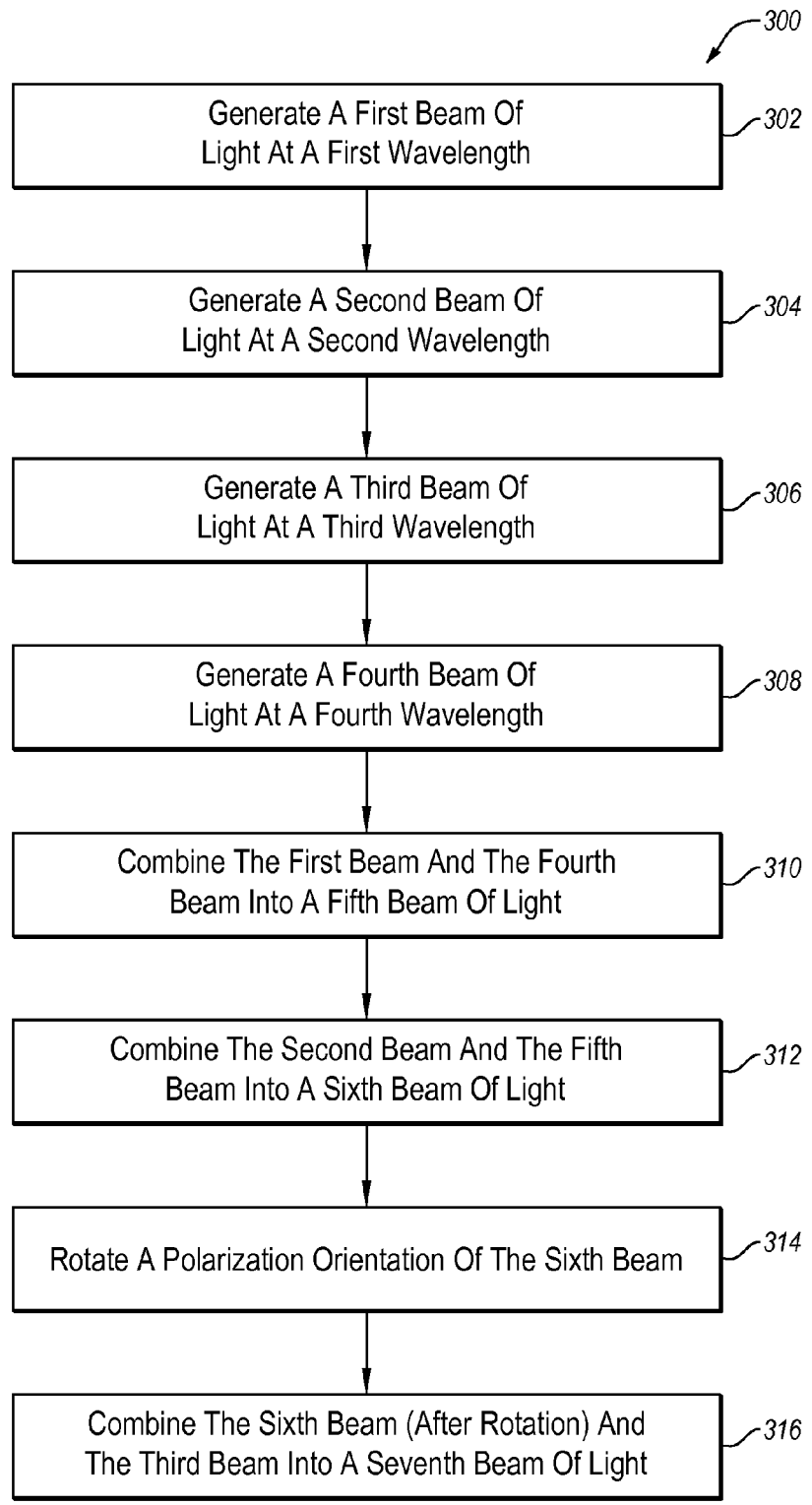
FIG. 3 is a flowchart of a method of performing WDM.

FIG. 3 is a flowchart of an example method 300 of performing WDM, according to some embodiments described in the present disclosure. The method 300 may be implemented, in some embodiments, by a TOSA such as the TOSAs 100 and 200 of FIGS. 1, 2A, and 2B, respectively. Although illustrated as discrete blocks, various blocks may be divided into additional blocks, combined into fewer blocks, or eliminated, depending on the implementation.

The method 300 may begin at block 302 at which a first beam of light may be generated at a first wavelength. In some embodiments, the first beam may be generated by a first light source in the manner described above with respect to the first light source 102a and the first laser diode 202a of FIGS. 1 and 2A, respectively.

At block 304, a second beam of light may be generated at a second wavelength. In some embodiments, the second beam may be generated by a second light source in the manner described above with respect to the second light source 102b and the second laser diode 202b of FIGS. 1 and 2A, respectively.

At block 306, a third beam of light may be generated at a third wavelength. In some embodiments, the third beam may be generated by a third light source in the manner described above with respect to the third light source 102c and the third laser diode 202c of FIGS. 1 and 2A, respectively.

At block 308, a fourth beam of light may be generated at a fourth wavelength. In some embodiments, the fourth beam may be generated by a fourth light source in the manner described above with respect to the fourth light source 102d and the fourth laser diode 202d of FIGS. 1 and 2A, respectively.

In some embodiments, the wavelengths of the beams of light may be spaced according to a WDM standard such as a CWDM scheme. For example, a first difference between the first wavelength and the second wavelength may be at least substantially equal to 20 nm; a second difference between the second wavelength and the third wavelength may be at least substantially equal to 20 nm; and a third difference between the third wavelength and the fourth wavelength may be at least substantially equal to 20 nm. In particular, in some embodiments, the first wavelength may be approximately equal to or equal to 1270 nm, the second wavelength may be approximately equal to or equal to 1290 nm, the third wavelength may be approximately equal to or equal to 1310 nm, and the fourth wavelength may be approximately equal to or equal to 1330 nm.

Additionally or alternatively, in some embodiments, the first beam and the fourth beam may have a substantially same polarization orientation. In these or other embodiments, the second beam and the third beam have a substantially same polarization orientation that is at least substantially perpendicular to the polarization orientation of the first beam and the fourth beam.

At block 310, the first beam and the fourth beam may be combined into a fifth beam of light. The fifth beam may include the first beam at the first wavelength and the fourth beam at the fourth wavelength. In some embodiments, the first and fourth beams may be combined into the fifth beam by a filter such as the filter 210 described above with respect to FIGS. 2A and 2B.

At block 312, the second beam and the fifth beam may be combined into a sixth beam of light that includes the first beam at the first wavelength, the second beam at the second wavelength, and the fourth beam at the fourth wavelength. In some embodiments, the second beam and the fifth beam may be combined in to the sixth beam by a PBS configured according to the first PBS 212 described above.

At block 314, a polarization orientation of the sixth beam may be rotated. In some embodiments, the polarization orientation may be rotated by a wave plate such as described above with respect to the wave plate 213.

At block 316, the third beam and the sixth beam (after rotation of its polarization orientation) may be combined into a seventh beam of light that includes the first beam at the first wavelength, the second beam at the second wavelength, the third beam at the third wavelength, and the fourth beam at the fourth wavelength. In some embodiments, another PBS may be combine the third beam and sixth beam in a manner such as that described above with respect to the second PBS 214.

Accordingly, the method 300 may be used to perform WDM according to the present disclosure. Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 4:
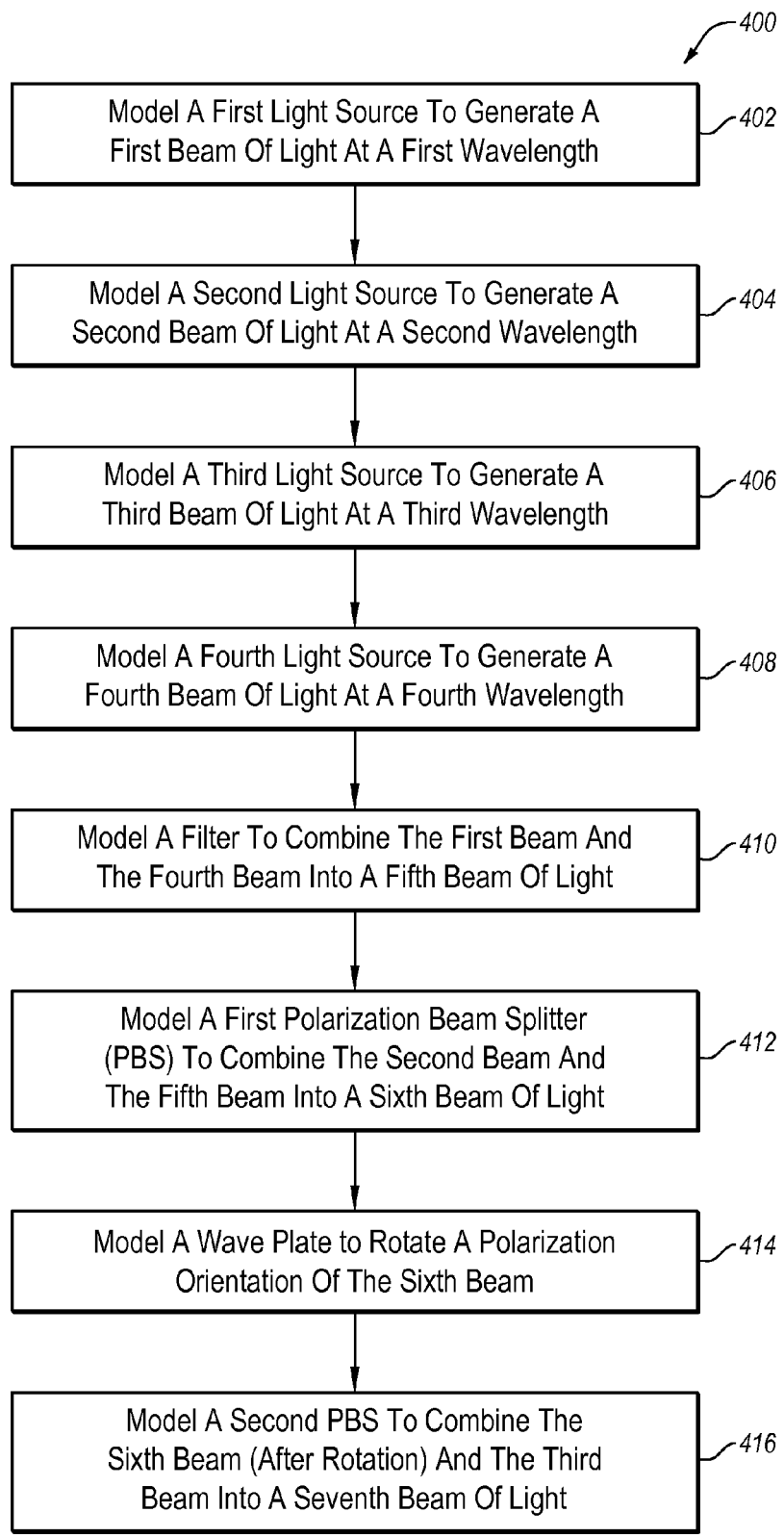
FIG. 4 is a flowchart of a method of modeling a TOSA configured to perform WDM.

FIG. 4 is a flowchart of an example method 400 of modeling a TOSA configured to perform WDM, according to some embodiments described in the present disclosure. The method 400 may be implemented, in some embodiments, by a computing system using any applicable design software stored on a computer-readable storage medium according to the principles described above with respect to the TOSAs 100 and 200 of FIGS. 1, 2A, and 2B, respectively. Although illustrated as discrete blocks, various blocks may be divided into additional blocks, combined into fewer blocks, or eliminated, depending on the implementation.

The method 400 may begin at block 402 at which a first light source may be modeled. The first light source may be modeled such that it may be configured to generate a first beam of light at a first wavelength. In some embodiments, the first light source may be modeled as a laser diode.

At block 404, a second light source may be modeled. The second light source may be modeled such that it may be configured to generate a second beam of light at a second wavelength. In some embodiments, the second light source may be modeled as a laser diode.

At block 406, a third light source may be modeled. The third light source may be modeled such that it may be configured to generate a third beam of light at a third wavelength. In some embodiments, the third light source may be modeled as a laser diode.

At block 408, a fourth light source may be modeled. The fourth light source may be modeled such that it may be configured to generate a fourth beam of light at a fourth wavelength. In some embodiments, the fourth light source may be modeled as a laser diode.

In some embodiments, the wavelengths of the beams of light may be modeled such that they are spaced according to a WDM standard such as a CWDM scheme. For example, a first difference between the first wavelength and the second wavelength may be at least substantially equal to 20 nm; a second difference between the second wavelength and the third wavelength may be at least substantially equal to 20 nm; and a third difference between the third wavelength and the fourth wavelength may be at least substantially equal to 20 nm. In particular, in some embodiments, the first wavelength may be approximately equal to or equal to 1270 nm, the second wavelength may be approximately equal to or equal to 1290 nm, the third wavelength may be approximately equal to or equal to 1310 nm, and the fourth wavelength may be approximately equal to or equal to 1330 nm.

Additionally or alternatively, in some embodiments, the first light source and the fourth light source may be modeled such that the first beam and the fourth beam have a substantially same polarization orientation. In these or other embodiments, the second light source and the third light source may be modeled such that the second beam and the third beam have a substantially same polarization orientation that is at least substantially perpendicular to the polarization orientation of the first beam and the fourth beam.

At block 410, a filter may be modeled such that it may be configured to receive the first beam and the fourth beam. Further, the filter may be modeled such that it may combine the first beam and the fourth beam into a fifth beam of light. The fifth beam may include the first beam at the first wavelength and the fourth beam at the fourth wavelength.

In some embodiments, the filter may be modeled such that the first wavelength is within a bandwidth of the thin-film filter and such that the fourth wavelength is outside of the bandwidth of the thin film filter. Additionally or alternatively, the filter may be modeled such that the fourth wavelength is within the bandwidth of the filter and such that the first wavelength is outside of the bandwidth of the filter.

In some embodiments, the filter may also be modeled based on the differences between the first wavelength and the fourth wavelength. For example, in some embodiments, the first wavelength and the fourth wavelength are spaced by approximately 60 nm. In these embodiments, the filter may be modeled to have an isolation of 60 nm or less. In these or other embodiments, the filter may be modeled to have an isolation between 40 nm and 60 nm.

In some embodiments, the filter may be modeled as a thin-film filter. Additionally or alternatively, the filter may be modeled based on the first polarization orientation of the first beam and the fourth beam such that the first and fourth beams in the fifth beam have the first polarization orientation.

At block 412, a first PBS may be modeled such that it is configured to receive the second beam and the fifth beam. The first PBS may also be configured to combine the second beam and the fifth beam into a sixth beam of light that includes the first beam at the first wavelength, the second beam at the second wavelength, and the fourth beam at the fourth wavelength. In some embodiments, the first PBS may be modeled such that it is configured (e.g., positioned) according to the first PBS 212 described above.

At block 414, a wave plate may be modeled such that it is configured to receive the sixth beam and such that it is configured to rotate a polarization orientation of the sixth beam. The wave plate may be modeled such that it is configured to perform the polarization rotation such as described above with respect to the wave plate 213.

At block 416, a second PBS may be modeled such that it is configured to receive the third beam and the sixth beam following the polarization rotation of the sixth beam by the wave plate. The second PBS may also be modeled such that it is configured to combine the third beam and the sixth beam into a seventh beam of light that includes the first beam at the first wavelength, the second beam at the second wavelength, the third beam at the third wavelength, and the fourth beam at the fourth wavelength. In some embodiments, the second PBS may be modeled such that it is configured (e.g., positioned) according to the second PBS 214 described above.

Accordingly, the method 400 may be used to model a TOSA to perform WDM according to the present disclosure. Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

FIG. 5 illustrates an example embodiment of a computing system 500, according to one or more embodiments of the present disclosure. In some embodiments, the computing system 500 may be configured to implement one or more of the operations described above with respect to the method 400. In some embodiments, the computing system 500 may include one or more of the following: a processor 550, a memory 552, and a data storage 554. The processor 550, the memory 552, and the data storage 554 may be communicatively coupled.

In general, the processor 550 may include any suitable special-purpose or general-purpose computer, computing entity, or processing device including various computer hardware or software modules and may be configured to execute instructions stored on any applicable computer-readable storage media. For example, the processor 150 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, the processor 150 may include any number of processors configured to perform, individually or collectively, any number of operations described in the present disclosure.

In some embodiments, the processor 550 may be configured to interpret and/or execute program instructions and/or process data stored in the memory 552, the data storage 554, or the memory 552 and the data storage 554. In some embodiments, the processor 550 may fetch program instructions from the data storage 554 and load the program instructions in the memory 552. After the program instructions may be loaded into memory 552, the processor 550 may execute the program instructions.

The memory 552 and the data storage 554 may include computer-readable storage media for carrying or having computer-executable instructions or data structures stored thereon. Such computer-readable storage media may include any available media that may be accessed by a general-purpose or special-purpose computer, such as the processor 550. By way of example, and not limitation, such computer-readable storage media may include tangible or non-transitory computer-readable storage media including Random Access Memory (RAM), Read Only Memory (ROM), Electrically Erasable Programmable Read-Only Memory (EEPROM), CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 550 to perform a certain operation or group of operations.

As indicated above, the embodiments described in the present disclosure may include the use of a special purpose or general purpose computer including various computer hardware or software modules, as discussed in greater detail below. Further, as indicated above, embodiments described in the present disclosure may be implemented using computer-readable media for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the control system. In some embodiments, the different components, modules, engines, and services described in the present disclosure may be implemented as objects or processes that execute on the control system (e.g., as separate threads).

While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any control system as previously defined in the present disclosure, or any module or combination of modulates running on a control system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system comprising:
a first light source configured to generate a first beam of light at a first wavelength;
a second light source configured to generate a second beam of light at a second wavelength;
a third light source configured to generate a third beam of light at a third wavelength;
a fourth light source configured to generate a fourth beam of light at a fourth wavelength;
a thin-film filter configured to receive the first beam and the fourth beam and configured to combine the first beam and the fourth beam into a fifth beam of light that includes the first beam at the first wavelength and the fourth beam at the fourth wavelength;
a first polarization beam splitter (PBS) configured to receive the second beam and the fifth beam and configured to combine the second beam and the fifth beam into a sixth beam of light that includes the first beam at the first wavelength, the second beam at the second wavelength, and the fourth beam at the fourth wavelength;
a wave plate configured to receive the sixth beam and configured to rotate a polarization orientation of the sixth beam; and
a second PBS configured to receive the third beam and the sixth beam following rotation of the polarization orientation of the sixth beam and configured to combine the third beam comprising a single beam and the sixth beam comprising a combined beam into a seventh beam of light that includes the first beam at the first wavelength, the second beam at the second wavelength, the third beam at the third wavelength, and the fourth beam at the fourth wavelength, and the sixth beam including at least a first plurality of the first, second, third and fourth beams having a first polarization and at least one of the first, second, third and fourth beams different from the first plurality having a different polarization than the first plurality.

2. The system of claim 1, wherein:
the first wavelength and the second wavelength differ by 20 nanometers (nm);
the second wavelength and the third wavelength differ by 20 nm;
the third wavelength and the fourth wavelength differ by 20 nm;
the first wavelength and the third wavelength differ by 40 nm; and
the first wavelength and the fourth wavelength differ by 60 nm.

3. The system of claim 1, wherein:
the first wavelength is at least substantially equal to 1270 nanometers (nm);
the second wavelength is at least substantially equal to 1290 nm;
the third wavelength is at least substantially equal to 1310 nm; and
the fourth wavelength is at least substantially equal to 1330 nm.

4. The system of claim 1, wherein the first wavelength, the second wavelength, the third wavelength, and the fourth wavelength are spaced according to a course wavelength division multiplexing (CWDM) standard.

5. The system of claim 1, wherein:
the first beam and the fourth beam have a first polarization orientation; and
the second beam and the third beam have a second polarization orientation substantially perpendicular to the first polarization orientation.

6. The system of claim 5, wherein:
the polarization orientation of the sixth beam includes the first polarization orientation and the second polarization orientation; and
rotation of the polarization orientation of the sixth beam by the wave plate includes rotation of the first polarization orientation and of the second polarization orientation by 45°.

7. The system of claim 5, wherein the wave plate includes a half-wave plate configured to rotate the polarization orientation of the sixth beam by 45°.

8. The system of claim 7, wherein the half-wave plate includes an axis aligned to 22.5° with respect to the first polarization orientation or with respect to the second polarization orientation.

9. The system of claim 1, wherein the thin-film filter has a filter isolation between 40 and 60 nanometers (nm).

10. A method comprising:
generating a first beam of light at a first wavelength;
generating a second beam of light at a second wavelength;
generating a third beam of light at a third wavelength;
generating a fourth beam of light at a fourth wavelength;
combining the first beam and the fourth beam into a fifth beam of light that includes the first beam at the first wavelength and the fourth beam at the fourth wavelength;
combining the second beam and the fifth beam into a sixth beam of light that includes the first beam at the first wavelength, the second beam at the second wavelength, and the fourth beam at the fourth wavelength;
rotating a polarization orientation of the sixth beam; and
combining the sixth beam comprising a combined beam, after rotating the polarization orientation of the sixth beam, and the third beam comprising a single beam into a seventh beam of light that includes the first beam at the first wavelength, the second beam at the second wavelength, the third beam at the third wavelength, and the fourth beam at the fourth wavelength, and the sixth beam including at least a first plurality of the first, second, third and fourth beams having a first polarization and at least one of the first, second, third and fourth beams different from the first plurality having a different polarization than the first plurality.

11. The method of claim 10, wherein:
the first wavelength and the second wavelength differ by 20 nanometers (nm);
the second wavelength and the third wavelength differ by 20 nm;
the third wavelength and the fourth wavelength differ by 20 nm;
the first wavelength and the third wavelength differ by 40 nm; and
the first wavelength and the fourth wavelength differ by 60 nm.

12. The method of claim 10, wherein:
the first wavelength is at least substantially equal to 1270 nanometers (nm);
the second wavelength is at least substantially equal to 1290 nm;
the third wavelength is at least substantially equal to 1310 nm; and the fourth wavelength is at least substantially equal to 1330 nm.

13. The method of claim 10, wherein the first wavelength, the second wavelength, the third wavelength, and the fourth wavelength are spaced according to a course wavelength division multiplexing (CWDM) standard.

14. The method of claim 10, wherein:
the first beam and the fourth beam have a first polarization orientation; and
the second beam and the third beam have a second polarization orientation substantially perpendicular to the first polarization orientation.

15. The method of claim 14, wherein:
the polarization orientation of the sixth beam includes the first polarization orientation and the second polarization orientation; and
rotation of the polarization orientation of the sixth beam includes rotation of the first polarization orientation and of the second polarization orientation by 45°.

16. A method comprising:
modeling a first light source such that it is configured to generate a first beam of light at a first wavelength;
modeling a second light source such that it is configured to generate a second beam of light at a second wavelength;
modeling a third light source such that it is configured to generate a third beam of light at a third wavelength;
modeling a fourth light source such that it is configured to generate a fourth beam of light at a fourth wavelength;
modeling a thin-film filter such that it is configured to receive the first beam and the fourth beam and configured to combine the first beam and the fourth beam into a fifth beam of light that includes the first beam at the first wavelength and the fourth beam at the fourth wavelength;
modeling a first polarization beam splitter (PBS) such that it is configured to receive the second beam and the fifth beam and configured to combine the second beam and the fifth beam into a sixth beam of light that includes the first beam at the first wavelength, the second beam at the second wavelength, and the fourth beam at the fourth wavelength;
modeling a wave plate such that it is configured to receive the sixth beam and configured to rotate a polarization orientation of the sixth beam; and
modeling a second PBS such that it is configured to receive the third beam and the sixth beam following rotation of the polarization orientation of the sixth beam and configured to combine the third beam comprising a single beam and the sixth beam comprising a combined beam into a seventh beam of light that includes the first beam at the first wavelength, the second beam at the second wavelength, the third beam at the third wavelength, and the fourth beam at the fourth wavelength, and the sixth beam including at least a first plurality of the first, second, third and fourth beams having a first polarization and at least one of the first, second, third and fourth beams different from the first plurality having a different polarization than the first plurality.

17. The method of claim 16, wherein:
the first wavelength and the second wavelength differ by 20 nanometers (nm);
the second wavelength and the third wavelength differ by 20 nm;
the third wavelength and the fourth wavelength differ by 20 nm;
the first wavelength and the third wavelength differ by 40 nm; and
the first wavelength and the fourth wavelength differ by 60 nm.

18. The method of claim 16, wherein:
the first beam and the fourth beam have a first polarization orientation;
the second beam and the third beam have a second polarization orientation substantially perpendicular to the first polarization; and
modeling the first PBS and the second PBS configurations based on the first polarization orientation and the second polarization orientation.

19. The method of claim 16, wherein modeling the wave plate includes modeling the wave plate as a half-wave plate configured to rotate the polarization orientation of the sixth beam by 45°.

20. The method of claim 16, further comprising modeling the thin-film filter to have a filter isolation between 40 and 60 nanometers (nm).

* * * * *